Figure 1:
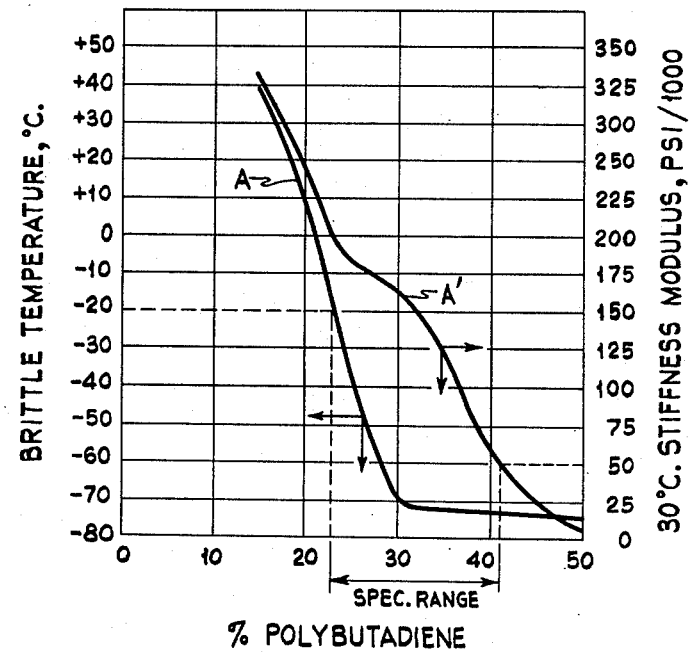

EFFECT OF POLYBUTADIENE CONTENT ON ROOM TEMPERATURE STIFFNESS AND LOW TEMPERATURE FLEXIBILITY OF STYRENE-ACRYLONITRILE POLYMERIZED ON <60°C. POLYBUTADIENE.

EFFECT OF POLYBUTADIENE CONTENT ON ROOM TEMPERATURE STIFFNESS AND LOW TEMPERATURE FLEXIBILTY OF STYRENE POLYMERIZED ON 90°C. POLYBUTADIENE.

INVENTORS
GEORGE H. FREMON
WILLIAM N. STOOPS
ATTORNEY

United States Patent Office

3,168,593
Patented Feb. 2, 1965

3,168,593
SHOCK - RESISTANT COMPOSITIONS PREPARED BY POLYMERIZING STYRENE AND ACRYLONITRILE WITH POLYBUTADIENE
George H. Fremon and William N. Stoops, Charleston, W. Va., assignors to Union Carbide Corporation, a corporation of New York
Filed Jan. 15, 1953, Ser. No. 331,439
4 Claims. (Cl. 260—880)

The physical properties of compositions based on thermoplastic resins are sharply dependent in general on the environmental temperature. Thus, such plastic compositions tend to become softer and more flexible as the temperature is increased and to become more rigid and brittle as the temperature is decreased. Thus, very few plastic compositions are capable of useful application over a wide range of temperatures. As a general rule, compositions which are adequately flexible and non-brittle at extremely low temperatures do not possess rigidity at room temperatures and above. Conversely, those compositions which are tough and rigid at room temperatures tend to be quite brittle at extremely low temperatures.

We have invented a plastic composition and a method of making it, which composition is tough and rigid at ordinary temperatures and which is free from brittleness at low temperatures. More specilcally, our plastic composition has a brittle temperature below −20° C. and a stiffness modulus of elasticity at 30° C. of at least 50,000 p.s.i. In addition the plastic composition has unusually high impact strength and resistance to shattering, and these properties are retained at temperatures below −20° C.

The first step in the preparation of the plastic composition is to polymerize butadiene as essentially the sole monomer to a polybutadiene having a relatively high molecular weight. To achieve this, the polymerization of the butadiene is conducted in the presence of a polymerization catalyst and at a temperature below 60° C. The next step in the preparation of the plastic composition is to polymerize a mixture of styrene and acrylonitrile, in certain specified proportions, in the presence of a specified amount of the polybutadiene. This second step may be termed "consecutive polymerization" and it is believed that a certain amount of the styrene and acrylonitrile become chemically combined as side chains on the polybutadiene base polymer However, regardless of the validity of the theory, it has been established that the valuable combination of properties possessed by the new plastic composition are obtained only when the styrene and acrylonitrile are consecutively polymerized in the presence of the polybutadiene polymer; mere mechanical mixing of the polybutadiene with a styrene-acrylonitrile polymer giving products having high brittle points and inferior impact strength at low temperatures Furthermore, it is essential to polymerize the styrene-acrylonitrile polymer in the presence of the previously formed polybutadiene; the reverse procedure in which the butadiene is polymerized in the presence of a previously formed styrene-acrylonitrile polymer giving inferior products.

One of the valuable characteristics of the present invention is that the valuable combination of properties of low brittle point and high modulus of elasticity at 30° C. is obtained over a wide range of polybutadiene content, thus permitting a selection of optimum properties. In FIGURE 1 of the drawing, curve A shows how the brittle point of the composition varies with the polybutadiene content; and curve A' shows the corresponding variation in the stiffness modulus of elasticity. Thus, between a polybutadiene content of 23% and 41%, there may be obtained a wide range of compositions having physical properties varying from a brittle point of −20° C. and a stiffness modulus of about 200,000 p.s.i. to a brittle point of −73° C. and a stiffness modulus of 50,000 p.s.i. A very unusual characteristic of the present compositions is the marked difference in the slopes of the curves A and A' between polybutadiene contents of 24 and 34%. The great practical advantage of this difference is that to gain a reduction of brittle point from −27° C. to −72° C., by changing the polybutadiene content within these limits, only a minor sacrifice of stiffness modulus from 185,000 p.s.i. to 135,000 p.s.i. is necessary.

Figure 2:
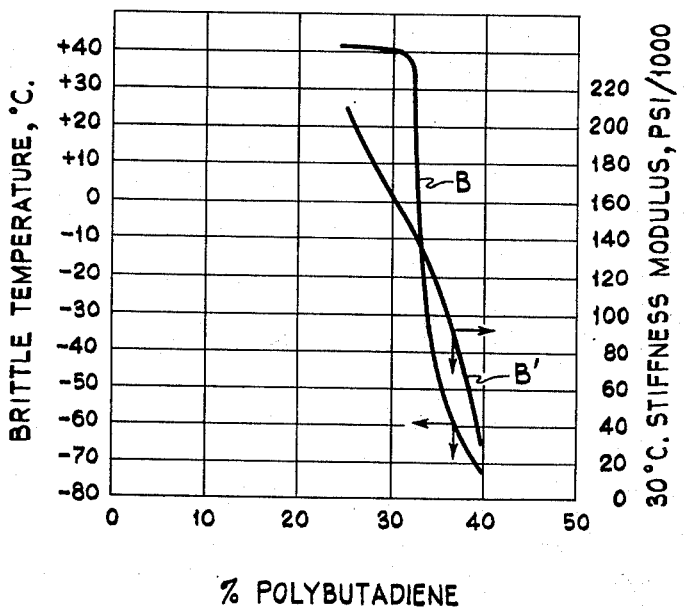

In order to compare the products of this invention with those of the prior art, curves B and B' of FIGURE 2 show the variations in brittle point and stiffness modulus with polybutadiene content of a resin composition prepared by polymerizing styrene in the presence of various amounts of a polybutadiene rubber polymerized at 90° C. It will be noted that the slope of the curves B' and B is extremely steep, indicating that minor variations in the polybutadiene content will have a pronounced effect on both the brittle point and stiffness modulus. Thus, the properties of the composition are very sensitive to changes in the polybutadiene content, and it would be very difficult to reproduce any given composition. Thus, the compositions would have a stiffness modulus above 50,000 p.s.i. and a brittle temperature below −20° C. over a very narrow range of polybutadiene content of 33.5 to 39%. Also, with the prior art compositions, it is impossible to produce compositions of very low brittle points of −70° C., and at the same time having a high stiffness modulus at 30° C. Thus, the compositions of the present invention provide a much wider range of useful properties than do the products of the prior art.

Other prior art products are known in which styrene and acrylonitrile are copolymerized in the presence of rubbery copolymers of butadiene and styrene. However these products, unlike those of the present invention, are brittle at low temperatures. Thus, the composition and properties of the polybutadiene component of the plastic composition are of great importance in obtaining the useful products of the present invention.

Thus, it is essential to use a polybutadiene which has been polymerized at a temperature below 60° C., for the reasons previously mentioned. Also, the lower the polymerization temperature, the more suitable is the polybutadiene for making shock-resistant plastic compositions; polybutadien rubber made at 10° C., for example, showing outstanding qualities. It is possible that the improved performance of this so-called "cold rubber" is caused by a less highly branched structure. It is also important that the polybutadiene be of relatively high molecular weight, as low molecular weight polybutadienes result in consecutive copolymers which are lacking in strength. Thus, the specific viscosity (an indication of molecular weight) of the polybutadiene should be at least 0.3, as measured with solutions of 0.2 gram of the polymer in 100 ml. benzene at 30° C.

(The specific viscosity is $\frac{\text{visc. solution}}{\text{visc. solvent}} - 1$)

The higher molecular weight polybutadienes are not completely soluble in benzene, and thus specific viscosities as determined above, cannot be measured. However, such higher molecular weight polybutadienes can be used in the practice of the invention, but somewhat higher quantities are required to obtain consecutive copolymers of the same brittle point as obtained with the lower molecular weight polybutadienes. Such higher molecular weight polybutadienes may be characterized by having Mooney plasticity numbers of 80 and above.

The effect of the molecular weight of the polybutadiene on the physical properties of styrene-acrylonitrile-polybutadiene consecutive copolymers is shown in the following table.

| Specific viscosity Polybutadiene | Polymer composition | | | Polymer properties | | |
|---|---|---|---|---|---|---|
| | Percent Butadiene | Percent Styrene | Percent Acrylonitrile | Brittle temp., °C. | $T_4$, °C. | Stiffness modulus, p.s.i. |
| 0.24 | 32 | 46 | 22 | <−80 | +5 | <10,000 |
| 0.48 | 32 | 47 | 21 | <−80 | +97 | 105,000 |
| 0.78 | 32 | 46 | 22 | −78 | +102 | 135,000 |

The test values are determined as follows:

Brittle temperature, °C.: The brittle point of a plastic material is defined as the lowest permissible temperature at which a specimen may be bent at a specified rate of loading without breaking. A.S.T.M. test D746–44T.

$T_4$ temperature, °C.: This test determines the temperature at which the specimen under examination shows a stiffness modulus of 10,000 p.s.i. The procedures used are a modification of the A.S.T.M. test D1943–49T, "Stiffness Properties of Nonrigid Plastics as a Function of Temperature by Means of a Torsional Test," in which the test machine weights and specimen thickness specifications have been altered to permit measurement of stiffness modulus in the range of 10,000 p.s.i. rather than the A.S.T.M. prescribed range of 135,000 p.s.i. Actually the weights used are adjusted to provide one-half the torsional force specified by the A.S.T.M. test and the specimen thickness specifications changed from 40 mils to 70 mils. The $T_4$ temperature defines approximately the upper temperature at which a semi-rigid plastic material retains appreciable strength.

Stiffness modulus at 30° C., p.s.i.: This value is determined from the stiffness modulus-temperature curve obtained with the $T_4$ test procedure, above. The value provides a measure of the rigidity of the plastic material at room temperature.

As noted in the drawing, the polybutadiene content of the consecutive copolymer has a significant influence on its physical properties. Thus, in order to obtain compositions having brittle temperatures below −20° C. and a stiffness modulus at 30° C. above 50,000 p.s.i. it is essential that the polybutadiene content of the consecutive copolymer be within the range of 23 to 41% by weight. The effect of polymer composition on the physical properties of the consecutive copolymer is shown in the following table.

| Polymer Composition | | | Brittle Temp., °C. | $T_4$, °C. | Stiffness Modulus, p.s.i. |
|---|---|---|---|---|---|
| Percent Polybutadiene | Percent Styrene | Percent Acrylonitrile | | | |
| 15 | 50 | 35 | >+40 | 107 | 335,000 |
| 25 | 55 | 20 | −38 | 105 | 185,000 |
| 31 | 47 | 22 | −72 | 101 | 160,000 |
| 38 | 43 | 19 | −72 | 95 | 85,000 |
| 50 | 36 | 14 | −74 | 20 | <10,000 |

The acrylonitrile content of the consecutive polymer contributes to the toughness and solvent-resistance of the consecutive copolymer. However, the concentration of acrylonitrile cannot be too high or the plastic composition is too brittle at low temperatures. Also, the material becomes too stiff to flux on heated roll-mills. Thus, a proper balance between the styrene and acrylonitrile contents must be maintained. For instance, a composition containing 40% polybutadiene, 38% styrene and 22% acrylonitrile has a stiffness modulus of 123,000 p.s.i., while a composition containing 40% polybutadiene and 60% styrene has a stiffness modulus of only 31,200 p.s.i. The following table gives further information on the effect of the styrene-acrylonitrile ratio on the physical properties of styrene-acrylonitrile-polybutadiene consecutive copolymers.

| Polymer Composition | | | Polymer Properties | | |
|---|---|---|---|---|---|
| Percent Acrylonitrile | Percent Styrene | Percent Polybutadiene | Brittle Temp., °C. | $T_4$, °C. | Stiffness Modulus, 30° C., p.s.i. |
| 10 | 60 | 30 | −54 | 97 | 145,000 |
| 20 | 48 | 32 | −70 | 101 | 150,000 |
| 28 | 40 | 32 | −58 | 103 | 130,000 |
| 33 | 34 | 33 | −6 | 92 | 170,000 |
| 50 | 17 | 33 | Could not flux on mill | | |

To summarize, therefore, the composition limits of the consecutive copolymer, based on the total weight of all the components, are as follows:

| | Percent |
|---|---|
| Polybutadiene | 23 to 41 |
| Acrylonitrile | 10 to 30 |
| Styrene | 29 to 67 |

As previously indicated, the preparation of the shock-resistant plastic compositions of this invention involves a fixed sequence of manufacture. The first step is the polymerization of butadiene to a polymer having the properties previously described. It is essential to conduct this polymerization at a temperature below 60° C., but otherwise a wide variety of polymerization conditions can be used, as are known in the art. Thus, bulk, solution or emulsion techniques can be used, the latter being preferred. The usual free-radical type polymerization catalysts are employed, such as organic peroxides. At low polymerization temperatures, the conventional redox recipes are useful.

In carrying out an emulsion polymerization, for example, an autoclave is purged of all air by water and nitrogen displacement procedures and the water, emulsifier, buffer, viscosity control agent and the reducing portion of the oxidation-reduction (redox) catalyst, if such is used, are charged to the autoclave. Next, the butadiene, modifiers and catalyst are added when the autoclave has been brought to polymerization temperature. The polymerization reaction is usually carried to about 75% conversion, and the unreacted butadiene stripped off.

A typical charge for a polymerization conducted at 10° C. is as follows:

| | Parts by weight |
|---|---|
| Water | 180 |
| Butadiene | 100 |
| Sodium oleate (emulsifier) | 5 |
| Tertiary hexadecyl mercaptan (polymer viscosity control agent) | 0.75 |
| Cumene hydroperoxide (catalyst) | 0.56 |
| Tetraethylene pentamine (catalyst accelerator) | 0.2 |
| Diethylene triamine (catalyst accelerator) | 0.2 |
| 2-ethylhexanol (anti-foaming agent) | 0.75 |
| Potassium chloride (autoclave solution viscosity control agent) | 0.75 |
| Potassium hydroxide (pH control agent) | 0.13 |

The above formula is but one example of a "cold-rubber" recipe and others known to the art are also useful. For example, other emulsifying agents, such as potassium oleate or the potassium salt of hydrogenated tallow acids may be used. Other polymer viscosity control agents include t-dodecyl mercaptan, primary dodecyl mercaptan or mixed tertiary higher alkyl mercaptans. Other free radical type polymerization catalysts include organic and inorganic peroxides, such as diisopropyl benzene hydroperoxide.

The catalyst accelerators may be used either singly or combined. Tetraethylene pentamine, when used alone, yields a fast initial polymerization rate which thereafter decreases. Diethylene triamine, when used alone, yields a slow initial rate which thereafter increases. A combination of the two will yield an over-all constant rate. Also, periodically feeding fresh tetraethylene pentamine to the polymerization mixture will also yield an approximately constant rate.

The anti-foaming agent may be omitted until polymerization is complete and introduced prior to removal of unused monomer. Other antifoaming agents may be substituted such as tetradecanol or other long chain alcohols.

In place of potassium chloride, other potassium salts or methanol can be used to prevent an undue rise in the viscosity of the autoclave charge. In place of potassium hydroxide, other pH control agents can be used to adjust the pH, such as sodium hydroxide or sodium or potassium carbonate.

The second essential manufacturing step is the polymerization of the styrene and acrylonitrile in the presence of the previously polymerized polybutadiene. The charge for this reaction consists of the polybutadiene latex, obtained as above, water, styrene, acrylonitrile, emulsifying agent and water. The usual procedure is to add the catalyst after the charge has reached polymerization temperature, which is usually 50° C., but may vary from 30° to 90° C. The polymerization is carried out under nitrogen atmosphere and preferably carried to 100% conversion. If not, the unreacted monomer may be removed by steam distillation. After the addition of any of the conventional rubber anti-oxidants, such as di-tert-butyl-para-cresol or sym. di-beta-naphthyl-para-phenylenediamine the copolymerized rubber-resin mixture is recovered by conventional precipitation procedures, using aqueous calcium chloride solutions, isopropanol-water mixtures, acetic acid-water mixtures or sodium chloride-sulfuric acid aqueous solutions. To control the rate of polymerization and provide thermal control of the reaction, the styrene and acrylonitrile may be added in increments. Polymers prepared in this manner also are easier to work on roll-mills as lower processing temperatures are required.

A typical charge for this second step is as follows:

| | Parts by weight |
|---|---|
| Water (including that in the rubber latex) | 300 |
| Polybutadiene (contained basis) | 30 |
| Styrene | 50 |
| Acrylonitrile | 20 |
| Tertiary hexadecyl mercaptan | 0.1 |
| Sodium oleate | 0.5 |
| Potassium persulfate | 0.5 |

Where applicable, the same polymerization ingredients as discussed for the butadiene polymerization may be substituted above. In addition, ammonium persulfate may be substituted for the potassium persulfate catalyst.

The physical properties of a typical styrene-acrylonitrile-polybutadiene consecutive copolymer prepared as indicated above are given below. For comparison, the properties of a commercial plastic, which is a mixture of a styrene-acrylonitrile copolymer with a butadiene-acrylonitrile rubber, are given:

| Property | Styrene-Acrylonitrile Polybutadiene Consecutive Polymer | Mixture of Styrene Acrylonitrile Resin with Butadiene-Acrylonitrile Rubber |
|---|---|---|
| Flexural strength (p.s.i.) | 7,400 | 7,400 |
| Flexural modulus (p.s.i.)×10⁻⁶ | 0.22 | 0.26 |
| Tensile strength (p.s.i.) | 3,200 | 4,050 |
| Tensile modulus (p.s.i.)×10⁻⁶ | 0.16 | 0.19 |
| Elongation at break, percent | 160 | 53 |
| Rockwell hardness | R62 | R79 |
| Heat distortion, °C | 78 | 77 |
| $T_4$, °C | 101 | 85 |
| Brittle temperature, °C | −60 | −18 |
| Izod impact strength (ft.lb./inch of notch): | | |
| 77° F | 8.6 | 14.7 |
| 20° F | | 2.3 |
| 0° F | | 0.8 |
| −20° F | 6.8 | 0.5 |
| −60° F | 3.1 | |

It will be seen that the consecutive copolymer has equivalent strength and toughness at room temperature to commercial semi-rigid plastics, but is to be distinguished therefrom by its flexibility and impact strength at low temperatures. This is unique in the field of plastics. For further comparison, plasticized vinyl film is well known on the market for a variety of uses, yet even with specially prepared plasticizers, the brittle points of such film are in the range of −55° C. to −60° C. To obtain such low temperature flexibility in plasticized vinyl film, however, the degree of plasticization is such that the product is very flexible and rubber-like at room temperature, having a flexural modulus of about 1000 p.s.i. Thus, it is seen that the present product is characterized by being tough and semi-rigid at room temperature, equivalent to commercial products in its properties at room temperature, and yet is as flexible at low temperatures as highly plasticized vinyl film. Stated in other words, therefore, the change in physical properties with changes in temperature of the new consecutive copolymers is much less than the change which occurs with known thermoplastic compositions.

The following examples will further serve to characterize the invention:

*Example 1*

An aqueous emulsion containing 100 parts of butadiene-1,3, 200 parts of water, 3 parts of technical sodium oleate as emulsifying agent, 10 parts of carbon tetrachloride as polymerization modifier and 0.5 parts of potassium persulfate were heated for 65 hours at 50° C., giving 69% conversion of the monomer to synthetic rubber polymer. To 32 parts of this rubber in latex form was added 45 parts of monomeric styrene, 23 parts of monomeric acrylonitrile, 33 parts of water, 1.0 part of technical sodium oleate as additional emulsifying agent and 0.1 part potassium persulfate catalyst and the whole was heated at 40° C. for 25.5 hours for a 75% conversion of the monomers.

The product, freed of residual monomers, was recovered using conventional precipitation procedures and dried to a powder in a vacuum drier. Test plaques of the material prepared by conventional milling and hot-pressing procedures showed a brittle temperature of −42° C., 30° C. stiffness modulus of 157,000 p.s.i. and a $T_4$ temperature of 91° C.

*Example 2*

A latex of polybutadiene was prepared in a manner similar to Example 1, except that 0.2 part of tertiary dodecyl mercaptan was used as the polymerization modifier and the polymerization reaction was carried to only 43% conversion. To 38 parts of this rubber in latex form after removal of the monomer were added 41 parts of styrene, 21 parts of acrylonitrile, 180 parts of water, and 0.45 part of potassium persulfate catalyst. The polymerization was carried to 92% conversion of the monomers in 8.3 hours at 50° C.

The recovered consecutive polymer showed a brittle point of −70° C., a $T_4$ temperature of 89.5° C., a 30° C. stiffness modulus of 123,000 p.s.i. The material was non-shattering at temperatures as low as −20° F. and showed an Izod impact strength of 10.5 ft. lbs. per inch of notch at 77° F. and 9.1 ft. lbs. per inch of notch at −20° F.

*Example 3*

A synthetic rubber latex was prepared in a manner similar to Example 2 and 38 parts of this polybutadiene in latex form was mixed with 40.5 parts styrene, 20.5 parts acrylonitrile, 233 parts water, 0.5 part technical sodium oleate and 0.5 part potassium persulfate catalyst. This reaction was carried to virtually 100% conversion in 7.7 hours at a temperature of 50° C. The product showed a brittle point of −76° C., $T_4$ temperature of 92° C., 30° C., stiffness modulus of 140,000 p.s.i., and was non-shattering at −20° F.

The shatter resistance was determined by placing a flat specimen approximately six inches square over a circular aperture five inches in diameter and striking the specimen a sharp hammer blow. If the specimen was only slowly disformed and did not disintegrate in small pieces, it was considered non-shattering at the test temperature.

*Example 4*

This example illustrates the use of lower polymerization temperatures in preparing the polybutadiene.

A "cold-rubber" synthetic rubber latex was prepared using 100 parts monomeric butadiene-1,3, 180 parts water, 5 parts technical sodium oleate, 0.56 part cumene hydroperoxide, 0.4 part tetraethylene pentamine, 0.75 part 2-ethylhexanol, 0.75 part potassium chloride, 0.13 part potassium hydroxide, 0.75 part tertiary hexadecyl mercaptan and 3.7 parts benzene as solvent and dispersant for the mercaptan. The polymerization was conducted, with the addition of small quantities of cumene hydroperoxide catalyst and mercaptan modifier to keep the polymerization rate approximately constant, at 10° C. for 25.5 hours to a conversion of about 77%. Additions of catalyst were required because the iron content was not properly controlled. If the iron content is properly controlled, catalyst additions are not needed to maintain a constant rate.

With 32 parts of this synthetic rubber in latex form was combined 50 parts styrene, 18 parts acrylonitrile, 425 parts water, 0.5 part technical sodium oleate and 0.5 part potassium persulfate. This consecutive copolymerization was conducted at 50° C. for 7.0 hours to virtual 100% conversion.

The recovered product was composed of 32% by weight of butadiene, 50% by weight of styrene and 18% by weight of acrylonitrile. It showed a brittle point temperature of −68° C., $T_4$ temperature of 95° C., 30° C. stiffness modulus of 160,000 p.s.i. and was non-shattering at −20° F.

*Example 5*

This example shows the superiority of these consecutively copolymerized rubber-resin products over those resin-rubber mixtures of similar composition as to monomer content but obtained by mechanically mixing the separately polymerized rubber and resin.

An additional quantity of synthetic rubber was prepared by the procedure of Example 4. This rubber latex was used as follows:

A. One third of the latex was consecutively copolymerized with styrene and acrylonitrile to provide a rubber-resin composition containing 32% by weight of butadiene, 48% of styrene and 20% of acrylonitrile.

B. One third of the latex was mixed with styrene-acrylonitrile resin emulsion in such proportion that when the mixed emulsions were coprecipitated, the resulting product showed essentially the same ultimate composition as Part A.

C. The remainder of the rubber latex was precipitated and combined on a hot two-roll mill with sufficient styrene-acrylonitrile copolymer to yield a product showing essentially the same ultimate composition as A and B.

The phyiscal properties of these products are shown in the following table:

| Product | Brittle Temp., ° C. | $T_4$ Temp., ° C. | 30° C. Stiffness Modulus, p.s.i. | Shatter Test, −20° F. |
|---|---|---|---|---|
| A (Consecutive Polymer) | −54 | 94 | 138,000 | Non-shattering. |
| B (Emulsion mixed) | >+40 | 105 | 125,000 | Shattering. |
| C (Mill mixed) | >+40 | 105 | 151,000 | Do. |

It is evident from a comparison of the values in the table above that there is a pronounced difference in the physical properties of the consecutively copolymerized composition (A) and the mechanically mixed compositions (B) and (C). Molded specimens of product A are transparent and tough while product B and C are opaque and relatively brittle.

*Examples 6 and 7*

Two different rubber-resin compositions were prepared following the procedures described under Example 4, which serve to illustrate further the types of products obtainable within the described composition limits. Example 6 illustrates a composition containing nearly the maximum amount of acrylonitrile desirable since a significant increase in acrylonitrile content would have the undesirable effect of raising the brittle temperature without a commensurate increase in the stiffness of the composition. On the other hand the product of Example 6 is considerably stiffer than a product containing 32% polybutadiene and 68% styrene. Example 7 represents a product containing about the minimum desirable amounts of polybutadiene and acrylonitrile. The composition and physical properties of these examples are shown below:

| Example | Polybutadiene, Percent | Styrene, Percent | Acrylonitrile, Percent | Brittle Temp., ° C. | $T_4$ Temp., ° C. | 30° C. Stiffness Modulus, p.s.i. |
|---|---|---|---|---|---|---|
| 6 | 32 | 40 | 28 | −58 | 103 | 130,000 |
| 7 | 25 | 65 | 10 | −53 | 103 | 167,000 |

*Example 8*

This example illustrates the inferior effects obtained by using a butadiene-styrene copolymer rubber instead of a polybutadiene rubber in these consecutive copolymerized compositions.

An aqueous emulsion containing 75 parts butadiene-1,3, 25 parts styrene, 174 parts water, 15 parts sodium stearate soap as emulsifying agent, 0.67 part potassium persulfate as a catalyst and 0.45 part of lauryl mercaptan as polymerization modifier was heated 9.5 hours at 50° C. yielding essentially 100% conversion of the monomers to synthetic rubber copolymer. To 30 parts of the copolymer rubber thus obtained were added 48.5 parts of styrene, 21.5 parts of acrylonitrile, 0.4 part of potassium persulfate catalyst, 0.08 part of lauryl mercaptan modifier and sufficient water to make a total of 110 parts. The whole was then polymerized for 10 hours at 50° C. by which time essentially all the monomers had been converted to polymer. The consecutively copolymerized resin-rubber was coagulated with a small amount of acetic acid, washed thoroughly and dried in a vacuum dryer. The final product contained 30 parts butadiene-styrene rubber, 48.5 parts styrene and 21.5 parts of acrylonitrile. The low temperature properties of this material are inferior when compared with products of this invention of comparable composition as shown in the following table:

| Example | Rubbery Component, Percent | Resin Component | | Brittle Temp., °C. | T₄ Temp., °C. | 30° C. Stiffness Modulus, p.s.i. |
|---|---|---|---|---|---|---|
| | | Styrene, Percent | Acrylonitrile, Percent | | | |
| 5 | 32 | 48 | 20 | −54 | 94 | 138,000 |
| 8 | a 30 | 48.5 | 21.5 | −18 | 100 | 180,000 | a 30% rubber component = 7.5% styrene, 22.5% butadiene.

The compositions of the present invention may be readily fabricated by conventional methods including compression or injection molding, hot milling, calendering, laminating, hot pressing, drawing, planishing, drilling, sawing, punching and the like. However, its processing temperature 180° to 190° C., is somewhat higher than other plastics. This may be reduced by prolonged mixing in a Banbury mixer or like equipment.

What is claimed is:

1. Process for forming synthetic resins which comprises emulsifying butadiene as essentially the sole monomeric material in water containing an emulsifying agent and a free radical-type catalyst, polymerizing the butadiene at a temperature below about 60° C. to form a polymer having a specific viscosity above about 0.3, adding to the polymeric latex thus formed a mixture of styrene and acrylonitrile and polymerizing the styrene and acrylonitrile in the presence of the butadiene polymer to form a synthetic resin having as its ultimate composition from 23% to 41% of butadiene, from 29% to 67% of styrene, and from 10% to 30% of acrylonitrile, said synthetic resin having a brittle temperature below −20° C. and a stiffness modulus at 30° C. of at least 50,000 p.s.i.

2. Process as claimed in claim 1 in which the styrene and acrylonitrile are added in increments to the polymeric latex.

3. Process for forming synthetic resins which comprises emulsifying butadiene as essentially the sole monomeric material in water containing an emulsifying agent and a free radical-type polymerization catalyst, polymerizing the butadiene at a temperature below about 50° C., adding to the polymeric latex thus formed a mixture of styrene and acrylonitrile and polymerizing the styrene and acrylonitrile in the presence of the butadiene polymer to form a synthetic resin having as its ultimate composition from 23% to 41% of butadiene, from 29% to 67% of styrene and from 10% to 30% of acrylonitrile.

4. A synthetic resin having a brittle temperature below −20° C. and a stiffness modulus at 30° C. of at least 50,000 p.s.i., said resin being a polymer of a mixture of styrene and acrylonitrile polymerized in the presence of a polybutadiene homopolymer previously polymerized at a temperature below 60° C., the ultimate composition of said resin being from 23 percent to 41 percent of butadiene, from 10 percent to 30 percent of acrylonitrile, and from 29 percent to 67 percent of styrene.

References Cited by the Examiner
FOREIGN PATENTS
649,166  1/51  Great Britain.

MURRAY TILLMAN, *Primary Examiner.*

A. C. SCHWARTZ, W. G. BENGEL, D. ARNOLD, L. H. GASTON, *Examiners.*